April 2, 1963    G. B. RICHARDS    3,083,874
LIQUID TRANSMISSION SYSTEM
Filed April 22, 1958    4 Sheets-Sheet 1

INVENTOR.
George B. Richards
BY *Fidler, Crouse & Beardsley*
Attorneys

April 2, 1963 G. B. RICHARDS 3,083,874
LIQUID TRANSMISSION SYSTEM
Filed April 22, 1958 4 Sheets-Sheet 2
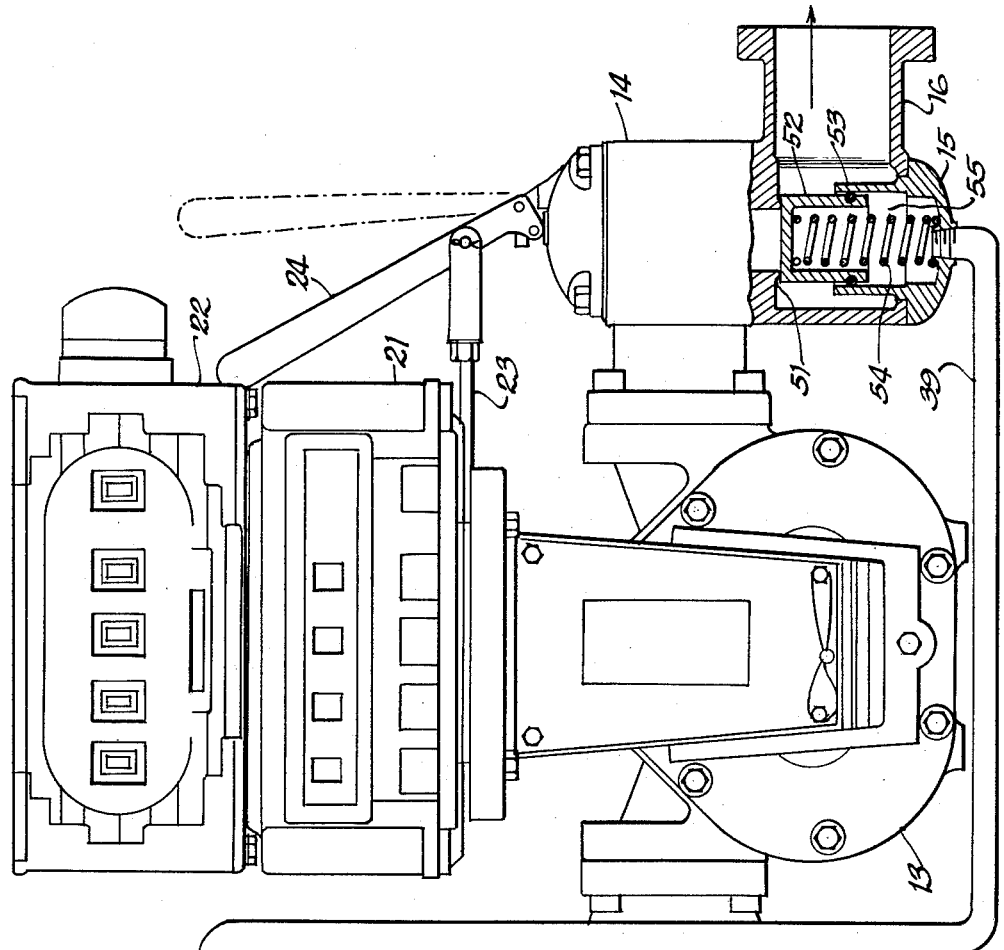
FIG. 2
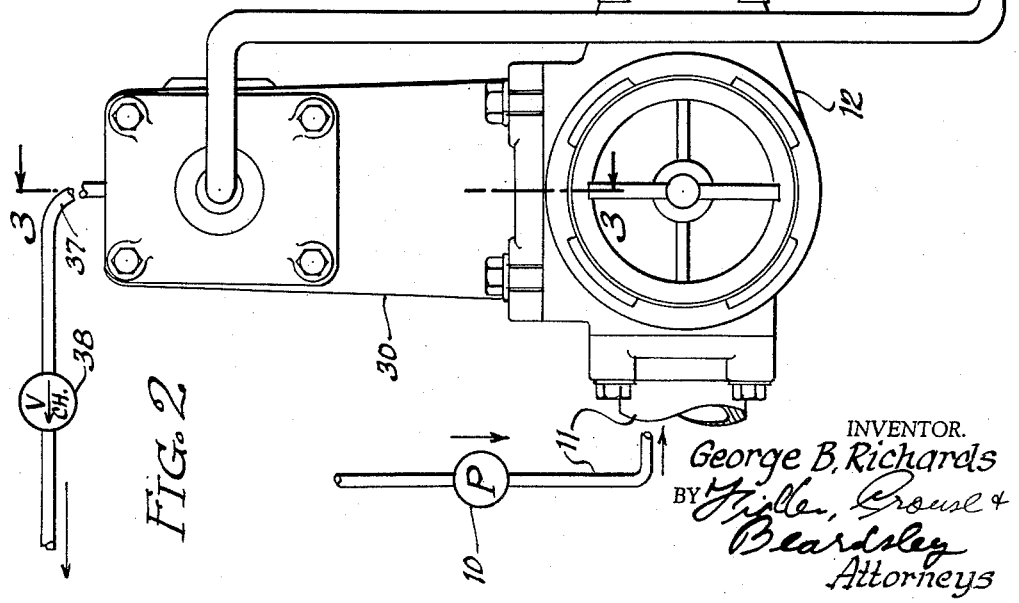
INVENTOR.
George B. Richards
BY Miller, Crouse &
Beardsley
Attorneys INVENTOR.
George B. Richards INVENTOR.
George B. Richards

United States Patent Office

3,083,874
Patented Apr. 2, 1963

3,083,874
LIQUID TRANSMISSION SYSTEM
George B. Richards, Deerfield, Ill., assignor to Liquid Controls Corporation, North Chicago, Ill., a corporation of Illinois
Filed Apr. 22, 1958, Ser. No. 730,148
13 Claims. (Cl. 222—67)

This invention relates to a liquid transmission system including apparatus for exhausting from such system foreign fluids immiscible with and having a different specific gravity than the liquid intended to be transmitted, and for temporarily interrupting transmission in the event of accumulation within the system of a predetermined quantity of such foreign fluid. It is an object of the invention to provide an improved liquid transmission system of such character.

This application covers an improvement of the apparatus disclosed and claimed in application Serial No. 553,506, entitled "Liquid Transmission Systems," filed December 16, 1955, by the same inventor, replaced by divisional application Serial No. 795,153, filed February 24, 1959, now Patent No. 2,992,757, dated July 18, 1961, and employs apparatus generally similar to that disclosed and claimed in application Serial No. 512,551, entitled "Liquid-Level Controlled Devices," filed June 1, 1955, by Henry Robert Billeter and George B. Richards, replaced by continuation application S.N. 775,077, filed November 19, 1958, now Patent No. 3,021,861, and divisional application S.N. 775,045, filed November 19, 1958, now Patent No. 2,977,972. The principal improvement over the liquid transmission systems disclosed and claimed in said application Serial No. 553,506 is the provision of apparatus which permits the interruption of liquid transmission, in the event of excessive accumulation of foreign fluid, to be only temporary. That is, flow interrupting apparatus is provided which permits the automatic resumption of liquid transmission after accumulated foreign fluid has been reduced to a predetermined quantity.

In accordance with the preferred embodiment of the invention a float chamber forming a portion of an air eliminator or liquid segregator is connected to the system at a point subjected to substantial line pressure, this chamber serving to collect foreign fluid by virtue of difference in specific gravity between the foreign fluid and the liquid intended to be transmitted. Restricted bleeding or exhaustion of the foreign fluid from this chamber is permitted by a valved opening, the valve discharge being under the control of a float which is of such effective specific gravity as to seek the plane of demarcation between the liquid and the foreign fluid. When the foreign fluid accumulates to a predetermined amount, the float opens the valve to permit exhaustion of the foreign fluid. When the foreign fluid is reduced in quantity below a predetermined amount, the float causes closing of the exhaust valve. Preferably the exhausted foreign fluid is fed back to a container of the primary liquid in order that any primary liquid which might be exhausted with the foreign fluid may be recovered.

Valve means are arranged in series in the liquid transmission system downstream of the float chamber for interrupting liquid transmission. This valve means is urged in an opening direction by line pressure but is closable by a fluid control pressure equal to the line pressure. The valve means may be biased toward closed position by any suitable means or may be subject to force amplifying means such that a control pressure equal to the line pressure will cause the valve means to close. The valve means is automatically openable by line pressure when the control pressure is substantially reduced.

Fluid carrying the control pressure is fed to the valve means through a second control valve in the float chamber. This second control valve is also operated by the float such that accumulation within the float chamber of a predetermined quantity of foreign fluid causes opening of this second control valve, whereby the foreign fluid, at line pressure, is fed to the valve means, temporarily interrupting liquid transmission. When the excessive accumulation of foreign fluid has been sufficiently exhausted through the first-mentioned control valve, the float causes closing of the control valves. The control pressure is then relieved through a small bleeder passage such that the valve means may again open under the influence of line pressure to permit resumption of liquid transmission.

The liquid transmission system therefore includes apparatus for interrupting transmission upon accumulation of foreign fluid in excess of a predetermined amount, and is self-recovering such that when the accumulated foreign fluid has been reduced in quantity transmission is automatically resumed.

Such a system is particularly desirable in instances wherein a single operator is preferably stationed at a substantial distance from the basic liquid transmission system. One such example is that of a fuel delivery truck, the single operator preferably being stationed at the actual point of delivery such that he may protect against overflow of the receiving receptacle. It will be apparent that if the basic liquid transmission system is capable of exhausting an excessive accumulation of foreign fluid and automatically resuming liquid transmission, the operator need not leave his station to reactuate the system.

It is another object of the invention to provide an improved liquid transmission system in which means are provided not only for accumulating and discharging a foreign fluid and interrupting transmission of the primary liquid in the event of an excessive accumulation of foreign fluid, but for automatically reestablishing transmission of the primary liquid when the accumulation of foreign fluid has been reduced to a predetermined quantity.

It is a further object of the invention to provide an improved liquid transmission system having various of the characteristics described above which operates satisfactorily as employed with a pressurized tank, a gravity flow system, or a system employing a pump.

It is still another object of the invention to provide an improved liquid transmission system having various of the characteristics described above while being reliable in operation, efficient, and inexpensive to manufacture.

This invention, together with further objects and advantages thereof, will best be understood by reference to the following description taken in connection with the accompanying drawings, and its scope will be pointed out in the appended claims.

In the drawings, in which like parts are designated by like reference numerals:

FIG. 2 is an elevational view of a liquid transmission system illustrating one embodiment of the invention;

Figure 1:
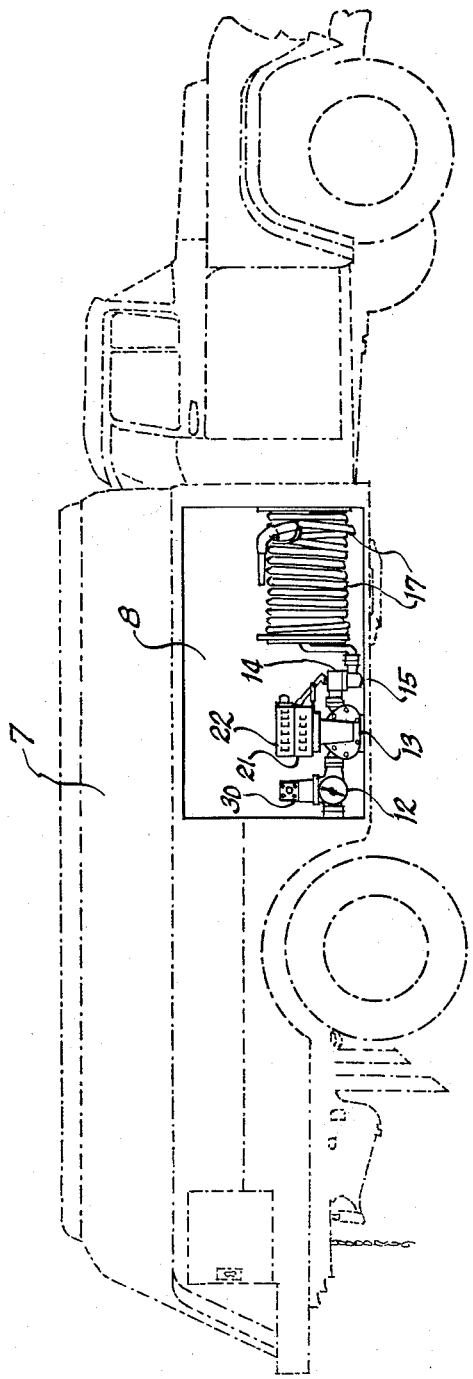
FIGURE 1 is an elevational view showing application of the invention to a fuel delivery truck.

A liquid transmission system incorporating the present invention is shown in FIG. 1 applied to a fuel delivery truck. The truck includes a supply tank 7, which may be compartmentalized, and a can box 8 located on the curb side of the truck and containing the major portion of the liquid transmission system constituting the present invention.

The liquid transmission system is shown in greater detail in FIG. 2. In this prefered embodiment it includes a pump 10 and a conduit 11 leading to a strainer 12. The strainer is shown directly connected to a meter 13 which is in turn directly connected to a cutoff valve 14. Liquid passes out of the bottom of the cutoff valve 14 to a pressure operated valve 15 and from there to a discharge conduit 16. The conduit 16 may connect to a flexible hose 17 or other final delivery conduit, and the inlet of the pump 10 is suitably connected to the supply tank 7. As indicated above the pump 10 may be omitted in favor of gravity flow or a pressurized tank.

Mounted on top of the meter 13 are a preset counter 21 and a register 22. The preset counter 21 is connected by a suitable link 23 to the operating handle 24 of the cutoff valve to interrupt flow after delivery of a predetermined amount. The apparatus for temporarily interrupting liquid transmission in the event of the accumulation of an excessive quantity of foreign fluid includes primarily control apparatus mounted on the strainer 12, and the pressure operated valve 15 arranged immediately below the cutoff valve 14.

Figure 3:
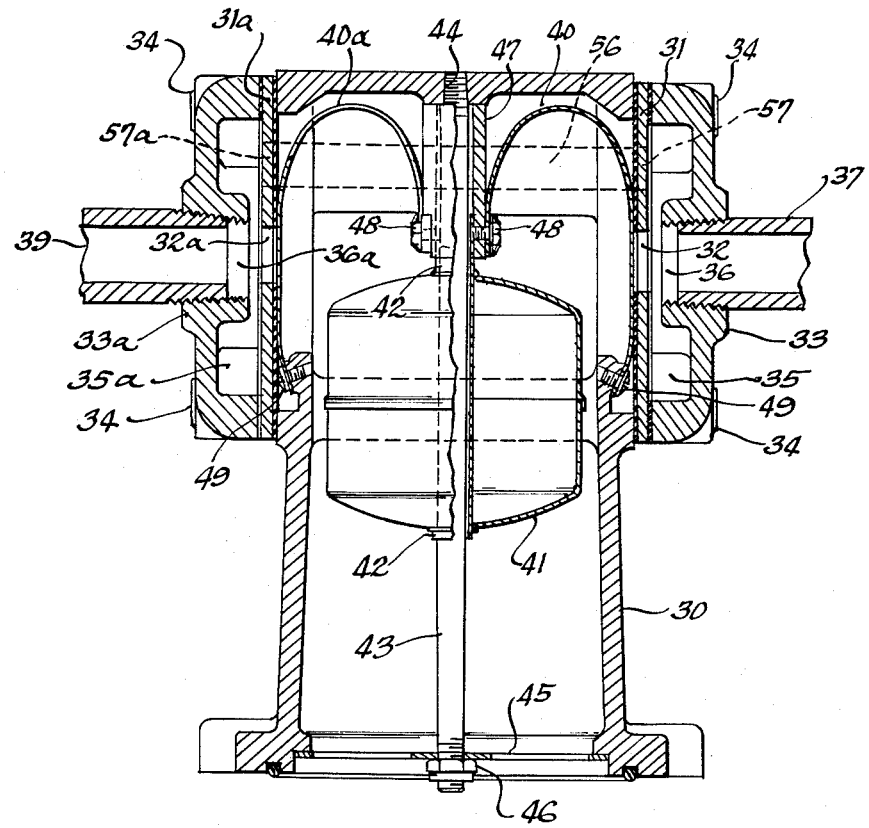
FIG. 3 is a cross-sectional view of certain control apparatus included in the system of FIGURES 1 and 2.

The control apparatus mounted on the strainer 12 includes a housing 30 forming a float chamber, best seen in FIG. 3. On opposite sides of the housing 30 adjacent the top thereof are a pair of openings which are substantially closed by plates 31 and 31a. Each of these plates has an orifice therein designated 32 and 32a respectively.

Immediately outside the plates 31 and 31a are respective end plates 33 and 33a. These end plates are secured to the housing 30 by any suitable means such as set screws 34, and clamp the plates 31 and 31a respectively against the housing. The end plates 33 and 33a are flanged as shown such that chambers 35 and 35a are formed between the plates 31 and 31a and the respective end plates 33 and 33a. The plate 33 has a tapped opening 36 therein in which a pipe 37 is threaded, this pipe leading through a check valve 38 (FIG. 2) back to the tank 7. The end plate 33a has a tapped opening 36a therein in which a pipe 39 is threaded, this pipe leading to the pressure operated valve 15 for reasons explained below. The float chamber defined by the housing 30 is therefore connected through the orifices 32 and 32a to the chambers 35 and 35a and to the pipes 37 and 39 respectively.

The orifices 32 and 32a are preferably quite narrow but of significant length in a vertical direction, for example, ¼" in width and ½" in length.

These orifices may be covered or closed by corresponding reed-type valve members 40 and 40a. The valve members are controlled by a float 41 consisting in part of a hollow tube 42 extending through the center thereof. This tube loosely receives a rod 43 whose upper end threadedly engages a threaded opening 44 in the top of the housing 30. The opening 44 is tapered, whereby a tight seal is attained at this point. The lower end of the rod 43 extends through a central opening in a spider 45 and is threaded to receive nut 46 whereby the rod is held firmly in place. The float 41 is free to slide up and down the rod 43 in response to the forces acting thereon.

The tube 42 extends upwardly beyond the float 41 and into a central bore in a block 47. This block is secured to the tube 42 by a pair of screws 48 which threadedly engage the block 47 and bear against or extend into the tube 42. The block 47 is thereby arranged to move with the float 41.

Each of the reed valve members 40 and 40a, referred to above, has one end secured to the block 47 by the screws 48. The extremities of these reeds are preferably doubled over the heads of the screws 48 such that the reeds are more firmly secured against rotation with respect to the block 47. The faces of the block 47 against which the reeds 40 and 40a are thus made to bear, are preferably at least as wide as the reeds.

The reeds extend upwardly, from their point of securing to the block 47, and are doubled over to extend downwardly past the corresponding orifices 32 and 32a, their other ends being secured to the housing 30 by screws 49.

Preferably the portions of the housing engaged by the lower ends of the reeds are sloping, as shown, such that the reeds are biased against the respective plates 31 and 31a.

It will now be seen that when the float 41 and the associated apparatus are in the raised position illustrated in FIG. 3, the reeds 40 and 40a will cover and close the respective orifices 32 and 32a. When the float moves downwardly from the position shown in FIG. 2, the reeds will be made gradually to peel away from the plates 31 and 31a to open the orifices from the top down.

In order that the reeds 40 and 40a may more effectively close the orifices 32 and 32a the inner faces of the plates 31 and 31a may be covered in any suitable manner by a resilient material, such as a plastic. Such lining or coating should not, of course, obstruct the orifices.

The housing 30 and the associated float-operated control valves are shown oriented in the drawings in such a manner as to permit the extraction or elimination from the system of air or other foreign fluid which is immiscible with and of lower specific gravity than the primary liquid intended to be transmitted by the system. When air, for example, is carried into the system along with liquid fuel, for example, the air will rise in the housing 30, displacing liquid fuel normally contained therein. The float 41 is of such effective specific gravity (in view of all forces acting thereon) that it will float on the liquid fuel and sink in the foreign fluid which the apparatus is intended to eliminate. In other words, the float seeks the plane of demarcation between the liquid fuel and the foreign fluid. As air or other foreign fluid of low specific gravity accumulates within the upper portion of the housing 30, the float 41 descends, a sufficient accumulation of air causing the opening of the two control valves. As air is eliminated from the system the level of the liquid fuel within the float chamber will rise and will lift the float such that the valves will again be closed.

As previously described, the orifice 32 and the chamber 35 are connected by a conduit 37, through a check valve 38, back to the tank 7 whereby the foreign fluid may be removed from the liquid transmission system. Also, any liquid fuel which might be carried off with the foreign fluid is carried back to the supply tank.

As previously described, the orifice 32a and the chamber 35a are connected by a conduit 39 with the pressure responsive valve 15, FIG. 2. This valve includes a valve seat 51, a movable valve member 52, which is preferably in the form of an inverted cup, and a fixed cylindrical guide member 53 which constitutes a part of the valve housing. An O ring is shown for effecting a seal between the valve element 52 and the guide member 53. A spring 54 urges the cup-shaped valve chamber 52 into engagement with the valve seat, suitable surfaces being provided on the valve seat 51 and the valve member 52 to permit a tight closure, all as is well understood in the art.

It will be seen that the conduit 39 leads into a closed, auxiliary chamber 55 defined by the guide member 53, a portion of the valve housing, and the movable valve member 52. It will also be seen that line pressure above the movable valve member 52 urges this valve member toward its open position. The closing force applied to the valve member 52 by the spring 54 is preferably small compared to forces applicable thereto by fluid pressures. Accordingly, if the chamber 55 has substantially atmospheric pressure therein, the line pressure above the valve element 52 will hold the latter in depressed or open position against the action of the spring 54. However, when the reed valve member 40a is pulled away from the orifice 32a, line pressure, which exists within the float chamber, is applied to the conduit 39 and to the chamber 55 of the pressure responsive valve 15. Since substantially equal pressures are then applied to opposite sides of the movable valve member 52, the spring 54 will close the valve.

Figure 4:
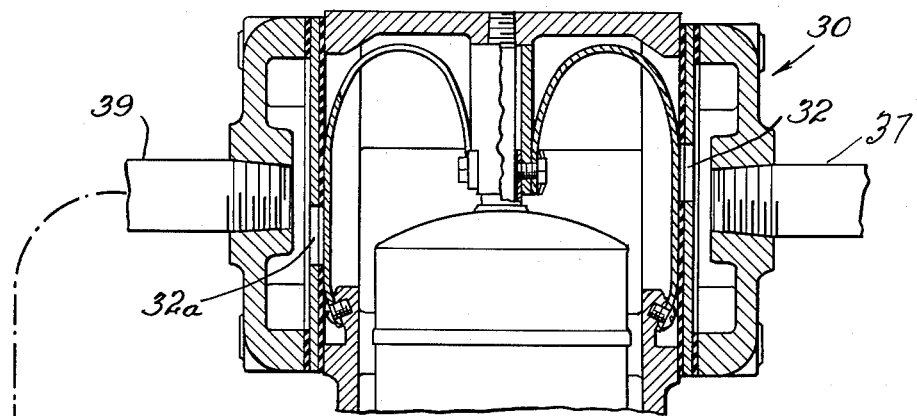
FIG. 4 is a somewhat fragmentary view, partially in cross-section of a second embodiment of the invention.
Figure 4:
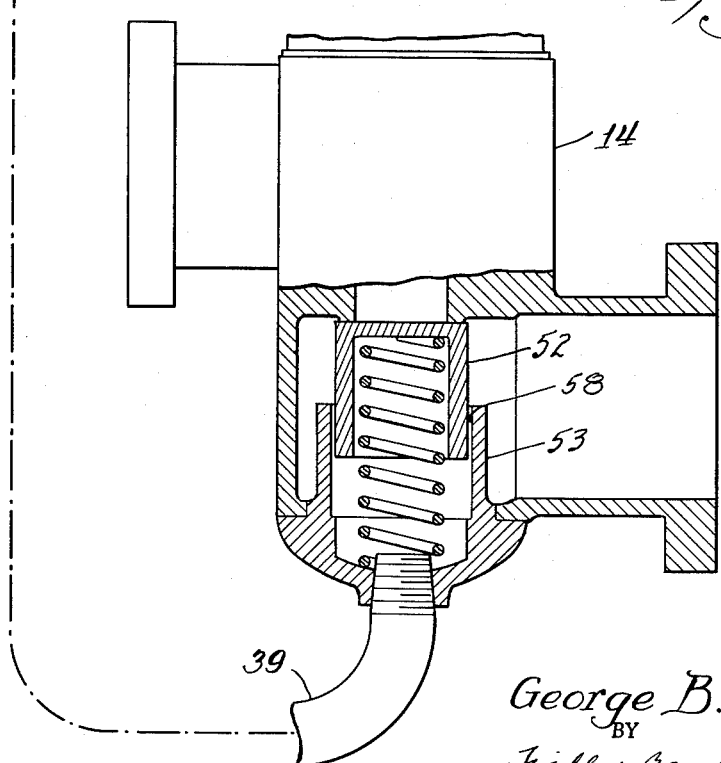

A bleeder orifice is preferably provided to permit the reduction of pressure within the chamber 55 when the orifice 32a is again covered by the reed 40a, that is, after air has been withdrawn from the system through the conduit 37 to permit the rising of the float 41. In the illustrated embodiment of the invention this orifice is provided within the housing 30. More specifically, a passage 56 is provided through a thick portion of the wall of the housing 30, and openings 57 and 57a are provided in the plates 31 and 31a respectively in alignment with the passage 56. The opening 57 in the plate 31 is of very small diameter, for example, $\frac{1}{32}''$, in order that the net effect of this passage between the compartments 35 and 35a is that of a bleeder orifice. More specifically, the orifice 57 should be small compared to the orifice 32a. This bleeder orifice may be omitted if a small clearance 58 is provided between the valve element 52 and the guide member 53, as by omitting the illustrated O ring, as shown in FIG. 4. However, the passage 56 and bleeder orifice 57 are preferred, as the size of the opening may thereby be more accurately controlled.

When an operator wishes to initiate operation of the liquid transmission system described above in its preferred embodiment, he starts the pump 10, sets the preset counter 21, and opens the cutoff valve 24. He may then carry the nozzle end of the hose 17 to the actual point of delivery. Fuel will begin to flow when he opens the nozzle valve at the end of the hose.

If air should for any reason be present in the fuel as it passes the float chamber, it will rise in the float chamber and accumulate at the top. If this accumulation of air is gradual, the orifices 32 and 32a will be uncovered gradually by descent of the float 41. The air may then be eliminated gradually through the upper portion of the orifice 32 into the chamber 35 and through the conduit 37 back to the tank 7. The major portion of the pressure drop will be across or through the orifice 32 whereby the pressure in the chamber 35 will be only slightly above atmospheric pressure. There will also be a small flow of air through the upper portion of the orifice 32a into the chamber 35a. If this flow is sufficiently small, pressure in the chamber 35a may be maintained only slightly above atmospheric pressure by virtue of the air bleeding through the passage 56 and the orifice 57 into the chamber 35. Under these circumstances the pressure responsive valve 15 would not close, even temporarily.

If the accumulation of air at the top of the float chamber is rapid, the float 41 will drop a greater distance and completely uncover the orifices 32 and 32a or at least a larger portion thereof. In such case there will be a larger flow of air into the chamber 35a such that it cannot be relieved by the bleeder opening 57. Accordingly, line pressure will be applied to the conduit 39 and to the chamber 55 such that the fluid pressures acting on the valve element 52 are substantially balanced, and the spring 54 will cause the valve to close temporarily.

If preferred, a faster rate of exhaust of the foreign fluid may be obtained without interruption of liquid transmission by arranging the orifice 32 higher in the wall of the housing than the orifice 32a, as shown in FIG. 4. This orifice may then be largely or completely opened, to permit a substantial exhaust flow, before the orifice 32a opens. The valve 15 will then not be closed unless the orifice 32 is incapable of exhausting the foreign fluid at the rate at which it is accumulating.

At such time as the excess foreign fluid within the housing 30 has been relieved through the orifice 32 and the pipe 37 back to the tank 7, the float will again rise and close the orifices 32 and 32a. The pressure in the chamber 35a and hence in the chamber 55 of the pressure responsive valve 15 will then be relieved through the passage 56 into the chamber 35 and to the tank 7 such that line pressure acting on the movable valve element 52 will reopen the valve 15.

A liquid transmission system has now been described in detail which accumulates foreign fluid, eliminates the foreign fluid from the liquid transmission system, and interrupts the flow of the primary liquid in the event of an excessive accumulation of foreign fluid. This prevents any significant transmission of the foreign fluid and therefore prevents the passage of such foreign fluid through the meter. The disclosed liquid transmission system furthermore automatically reestablishes transmission of the primary liquid when the excessive accumulation of foreign fluid has been reduced to a predetermined quantity. This permits a single operator to remain at a remote station in the event of a temporary interruption of liquid transmission rather than having to return to the transmission system proper to reactuate the system.

Many applications of the disclosed system, as well as many modifications of the system will be apparent to those skilled in the art. In the application shown, the principal purpose of accumulating a foreign fluid, eliminating it, and interrupting the transmission of the primary liquid in the event of an accumulation of an excessive quantity of foreign fluid, is to avoid metering of the foreign fluid. This is desirable since metering of air or other foreign fluid results in a false indication of the primary liquid delivered. The system may also be employed to advantage in any application wherein it is desired that delivery of a foreign fluid with a primary liquid be prevented.

If the foreign fluid to be extracted from the system is heavier than the primary liquid, the float chamber 30 should of course be inverted. The heavy foreign fluid will then accumulate in the chamber. The float should still be of such effective specific gravity that it seeks the plane of demarcation between the foreign fluid and the primary liquid. An excessive accumulation of the heavy foreign fluid will then cause the float to rise and open the orifices.

The pressure responsive valve 15 may of course be of various constructions, many of which are well known in the art. The spring 54 in the illustrated embodiment of the invention provides a net closing force when like pressures are applied to opposite sides of the movable valve element 52. The net closing force with balanced pressures may also be obtained by various force amplifying means such as a piston and cylinder and associated linkage or by various other means well known in the art. A net closing force may also be obtained by virtue of a significant difference in applied pressures. In the illustrated embodiment, for example, the pressure available in the line 39 is somewhat greater than the line pressure within the valve 15 since there is a minute pressure drop across the meter 13. This pressure difference is hardly sufficient to rely upon for closing the valve, but in some applications a pressure drop may exist between the float chamber and the valve which would provide an adequate net closing force.

Where a liquid transmission system embodying the present invention is employed as disclosed in the present application, flow of the primary liquid may be produced by a pressurized tank or a pump, or reliance may be placed upon gravity flow. Regardless of the source of pressure for producing the primary flow, the float chamber 30 and the pressure responsive valve 15 should be arranged in the system at points subjected to substantial line pressure. This is necessary in the case of the control apparatus associated with the float chamber 30 since a pressure is desired to cause elimination of the foreign fluid. Where the invention is employed with a gravity flow system, the exhaust conduit for foreign fluid preferably opens into the transmission system downstream of the valve. In the case in which a pump is employed, both the float chamber 30 and the pressure responsive valve 15 should be downstream of the pump and the valve should be downstream of the float chamber, since closing of the valve should not interrupt application of line pressure to the float chamber.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. In a liquid transmission system having, means for inducing transmission of a primary liquid, means for accumulating and exhausting from said system foreign fluid immiscible with and having a different specific gravity than said primary liquid, for interrupting liquid transmission in the event of accumulation within said system of a predetermined quantity of foreign fluid, and for automatically reestablishing liquid flow after the accumulated foreign fluid has been reduced in quantity; said means including a chamber connected to said system at a point subjected to line pressure for collecting foreign fluid by virtue of difference in specific gravity between said foreign fluid and the primary liquid, exhaust means, a control valve between said chamber and said exhaust means and openable to permit restricted flow of foreign fluid from said chamber to said exhaust means, valve means downstream of said chamber for controlling said liquid transmission, said valve means being urged open by line pressure in said system and being closable by a fluid control pressure equal to said line pressure, a passage connecting said chamber and said valve means for conveying foreign fluid to said valve means, a second control valve openable to permit the flow of foreign fluid from said chamber to said passage, a float within said chamber of such effective specific gravity as to seek the plane of demarcation between said liquid and said foreign fluid, means connecting said float to both of said control valves whereby said float opens said control valves when said foreign fluid accumulates beyond a predetermined quantity in said chamber and closes said valves when the accumulation of said foreign fluid decreses below a predetermined quantity, and bleeder means between said passage and said exhaust means for permitting restricted flow of fluid from said passage to said exhaust means, whereby said valve means may be opened by said line pressure when said second control valve closes.

2. In a liquid transmission system having, means for inducing transmission of a primary liquid, means for accumulating and exhausting from said system foreign fluid immiscible with and having a different specific gravity than said primary liquid, for interrupting liquid transmission in the event of accumulation within said system of a predetermined quantity of foreign fluid, and for automatically reestablishing liquid flow after the accumulated foreign fluid has been reduced in quantity; said means including a chamber connected to said system at a point subjected to line pressure for collecting foreign fluid by virtue of difference in specific gravity between said foreign fluid and the primary liquid, exhaust means, an orifice between said chamber and said exhaust means permitting restricted flow of foreign fluid from said chamber to said exhaust means, a progressively openable control valve for covering said orifice, valve means downstream of said chamber for controlling said liquid transmission, said valve means being urged open by line pressure in said system and being closable by a fluid control pressure equal to said line pressure, a passage connecting said chamber and said valve means for conveying foreign fluid to said valve means, a second orifice between said chamber and said passage permitting the flow of foreign fluid from said chamber to said passage, a second progressively openable control valve for covering said second orifice, a float within said chamber of such effective specific gravity as to seek the plane of demarcation between said liquid and said foreign fluid, means connecting said float to both of said control valves whereby said float causes said control valves to uncover said orifices when said foreign fluid accumulates beyond a predetermined quantity in said chamber and causes said control valves to cover said orifices when the accumulation of said foreign fluid decreases below a predetermined quantity, and bleeder means between said passage and said exhaust means for permitting restricted flow of fluid from said passage to said exhaust means, whereby said valve means may be opened by said line pressure when said second orifice is closed.

3. A device for interrupting the flow of a primary fluid in a liquid transmission system comprising a conduit, discharge means connected in said conduit for accumulating and discharging externally from said conduit and separately from said primary fluid a foreign fluid immiscible with and of a different specific gravity than the primary fluid, said primary fluid being a liquid, a cut-off valve including a housing connected in said conduit on the downstream side of said discharge means and having a valve element positioned to be urged toward open position by the flow of primary fluid through said valve housing and means for applying a fluid-generated closing force to said valve element to close the valve when the volume of accumulated foreign fluid in said discharge means exceeds a predetermined value.

4. A device for interrupting the flow of a primary fluid in a liquid transmission system comprising a conduit, discharge means connected in said conduit for accumulating and discharging externally from said conduit and separately from said primary fluid a foreign fluid immiscible with and of a different specific gravity than the primary fluid, said primary fluid being a liquid, a cut-off valve including a housing connected in said conduit on the downstream side of said discharge means and a valve element positioned to be urged toward open position by the primary fluid flowing through said valve housing, means including a conduit connecting said discharge means and said cut-off valve housing for applying to said valve element the pressure of fluid accumulated in said discharge means to close the valve when the volume of accumulated foreign fluid in said discharge means exceeds a predetermined value and, means for constantly and yieldably applying a closing force to said valve element less than the opening force exerted by said primary fluid.

5. A device for interrupting the flow of a primary fluid in a liquid transmission system, said device comprising a conduit discharge means connected to said conduit for accumulating and discharging from said conduit a foreign fluid immiscible with and of a different specific gravity than said primary fluid, said primary fluid being a liquid, said discharge means including an accumulating chamber having a plurality of discharge orifices, a plurality of control valves for closing said orifices and means actuated by the level of the primary fluid in said accumulating chamber for actuating said control valves, a cut-off valve including a housing defining a valve chamber connected in said conduit on the downstream side of said discharge means, a valve seat in said housing, a valve element disposed in said housing and positioned to be moved to open position by the pressure of primary fluid in said valve housing, said valve element defining with said housing an auxiliary chamber on the downstream side of said seat, means active upon the opening of one of said control valves for increasing the fluid pressure in said auxiliary chamber to close said cut-off valve, restricted passage means for bleeding said auxiliary chamber to a point of lower pressure and means connecting another of said orifices to a point of lower than line pressure and externally of said conduit.

6. A device for interrupting the flow of a primary fluid in a liquid transmission system, said device comprising a conduit, discharge means connected to said conduit for accumulating and discharging from said conduit a foreign fluid immiscible with and of a different specific gravity than said primary fluid, said primary fluid being a liquid, said discharge means including an accumulating chamber having a plurality of discharge orifices, a plurality of control valves for closing said orifices and means actuated by the level of the primary fluid in said accumulating chamber for controlling said control valves, a cut-off valve in said conduit including a housing defining a valve chamber connected in said conduit on the downstream side of said discharge means, a valve seat in said housing, a valve element disposed in said housing and positioned to be moved to open position by the pressure of primary fluid in said valve housing, said valve element defining with said housing an auxiliary chamber on the downstream side of said seat, means defining a passage connecting said auxiliary chamber and one of said discharge orifices for applying to said valve element in a closing direction the pressure of fluid discharged through said orifice, restricted passage means for bleeding said auxiliary chamber to a point of lower pressure and means connecting another of said orifices to a point of lower than line pressure and externally of said conduit.

7. A device for interrupting the flow of a primary fluid in a liquid transmission system, comprising a conduit, discharge means for accumulating and discharging from said conduit a foreign fluid immiscible with and of a different specific gravity than said primary fluid, said primary fluid being a liquid, said discharge means having a chamber with an inlet connected to said conduit, a plurality of discharge orifices leading from said chamber, control valves positioned to close said orifices, and means controlled by the level of said primary fluid in said chamber for controlling said control valves, a cut-off valve having a housing defining a valve chamber connected in said conduit on the downstream side of said discharge device and having a valve seat and, a valve element movable in said valve chamber between closed and open positions relatively to said seat and in position to be urged to open position by the pressure of liquid in said valve chamber, means defining a passage leading from one of said orifices to said valve housing for applying to said valve element in a closing direction the pressure of said foreign fluid when the corresponding control valve is opened, restricted passage means for bleeding said auxiliary chamber to a point of lower pressure, means connecting another of said orifices to a point of lower than line pressure and externally of said conduit, and means for constantly and yieldably applying a closing force to said valve element less than the opening force exerted by said primary fluid.

8. In a device for interrupting the flow of a primary fluid in a liquid transmission system, a conduit, discharge means connected in said conduit for accumulating and discharging externally from said conduit and separately from said principal fluid a foreign fluid immiscible with and of a different specific gravity than the primary fluid, said primary fluid being a liquid, a cut-off valve including a housing connected in said conduit on the downstream side of said discharge means, a valve element in said housing positioned to be urged toward open position by the flow of primary fluid through said housing, means actuated by the collection of a predetermined quantity of foreign fluid in said discharge means for discharging foreign fluid therefrom, means including a passage connecting said discharge means and said housing for applying the pressure of said foreign fluid on said valve element in a closing direction, and means for bleeding the fluid in said passage to a point of lower pressure.

9. In a liquid transmission system, a device for interrupting the flow of a primary fluid and a foreign fluid immiscible with and of a different specific gravity than said primary fluid, said primary fluid being a liquid, said device comprising a conduit, collecting means in said conduit for collecting said foreign fluid, a cut-off valve having a housing connected in said conduit downstream from said collecting means and a valve element movable in said housing between open and closed positions and movable to open position by the pressure of primary fluid in said valve housing, means for discharging said foreign fluid from said collecting means to a point externally of said conduit and separately from said primary fluid, means for closing said cut-off valve, and means active upon the collection of a predetermined quantity of foreign fluid in said collecting means for actuating said discharging means and said valve closing means.

10. In a liquid transmission system, a device for interrupting the flow of a primary fluid and a foreign fluid immiscible with and of a different specific gravity than said primary fluid, said primary fluid being a liquid, said device comprising a conduit, collecting means in said conduit for collecting said foreign fluid, a cut-off valve in said conduit having a housing connected in said conduit downstream from said collecting means and a valve element movable in said housing between open and closed positions and movable to open position by the pressure of the primary fluid flowing through said housing, means for discharging collected foreign fluid to a point externally of said conduit and separately from said primary fluid, control means for applying the pressure of said collected foreign fluid to said cut-off valve element to close said cut-off valve, and means active upon the collection of a predetermined quantity of foreign fluid in said collecting means for actuating said discharging means and said control means.

11. In a liquid transmission system, a device for interrupting the flow of a primary fluid and a foreign fluid immiscible with and of a different specific gravity than said primary fluid, said primary fluid being a liquid, said device comprising a conduit, means connected in said conduit for accumulating said foreign fluid, said accumulating means including accumulating chamber means having a plurality of discharge orifices for said foreign fluid, a plurality of control valves for closing said orifices respectively and means actuated by the accumulation of a predetermined quantity of primary fluid in said accumulating chamber means for opening said control valves, a cut-off valve including a housing defining a valve chamber connected in said conduit on the downstream side of said accumualting means and a valve element disposed in said housing for movement between open and closed positions and positioned to be moved to open position by the pressure of primary fluid in said valve housing, means connected to a first of said discharge orifices for opening said first control valve to discharge collected foreign fluid to a point externally of said main conduit when said first valve is open and means connected to a second of said orifices for closing said cut-off valve when the said second valve is open.

12. In a liquid transmission system, a device for interrupting the flow of a primary fluid and a foreign fluid immiscible with and of a different specific gravity than said primary fluid, said primary fluid being a liquid, said device comprising a main conduit, discharge means for accumulating and discharging foreign fluid from said conduit said discharge means including accumulating chamber means having first and second discharge orifices for said foreign fluid, first and second control valves for closing said orifices respectively and means actuated by the level of the primary fluid in said accumulating chamber means for actuating said control valves, a control conduit leading from said first orifice to a point of discharge externally of said main conduit for discharging foreign fluid from said chamber means when said first control valve is open, cut-off valve means including a housing connected in said conduit on the downstream side of said discharge means, a valve element disposed in said housing movement between open and closed positions and positioned to be moved to open position by the pressure of primary fluid in said valve housing, and means including a control conduit leading from a said second orifice to said cut-off valve means and active upon the opening of said second control to apply the fluid pressure in said chamber means to close said cut-off valve.

13. In a liquid transmission system, a main conduit for conducting a primary fluid said primary fluid being a liquid, and means for accumulating and exhausting from said main conduit a foreign fluid immiscible with and having a different specific gravity than said primary fluid, for interrupting fluid transmission in the event of accumulation within said system of a predetermined quantity of foreign fluid, and for automatically re-establishing fluid flow after the accumulated foreign fluid has been reduced in quantity, said means including chamber means connected in said conduit at a point subjected to substantial line pressure for collecting foreign fluid by virtue of difference in specific gravity between it and the primary fluid, a first control valve openable to permit flow of foreign fluid from said chamber means to exhaust means externally of said conduit, cut-off valve means in said conduit downstream from said chamber means for controlling fluid transmission through said conduit, said cut-off valve means being urged open by line pressure in said conduit and being closable by foreign fluid pressure, a passage for conveying foreign fluid to said cut-off valve means, a second control valve openable to permit the flow of foreign fluid from said chamber means to said passage, float means within said chamber means of such effective specific gravity as to seek the plane of demarcation between said primary fluid and said foreign fluid, means connecting said float means to said control valves whereby said float means opens said control valves when said foreign fluid accumulates beyond a predetermined quantity in said chamber means and closes said valves when said foreign fluid decreases below a predetermined quantity, and bleeder means for permitting restricted flow of fluid from said passage to a point of lower pressure, whereby said cut-off valve means may be opened by said line pressure when said second control valve closes.

References Cited in the file of this patent

UNITED STATES PATENTS

| | | |
|---|---|---|
| 1,362,954 | Mertens | Dec. 21, 1920 |
| 1,897,432 | Klotzman | Feb. 14, 1933 |
| 2,075,126 | Marden | Mar. 30, 1937 |
| 2,103,020 | Saarinen | Dec. 21, 1937 |
| 2,186,069 | Hazard | Jan. 9, 1940 |
| 2,693,196 | Hundley | Nov. 2, 1954 |